United States Patent [19]

Aubry et al.

[11] 3,708,157

[45] Jan. 2, 1973

[54] CONTINUOUS SINTERING FURNACE

[75] Inventors: Bernard Aubuy, 6, rue E, Givors-94 L'Hay-les-Roses; Jacques Gillot, 29, bd des Pipénées-93 Gagy; Yves Masselot, Le Clas, villa 4, Montee de Manen 4-Manosque; Albert Teboul, 3, seuil de Provence 84-Lapalud, all of France

[73] Assignee: Commissariat A L'Energie Atomique, Paris, France

[22] Filed: July 20, 1970

[21] Appl. No.: 56,458

[30] Foreign Application Priority Data

Aug. 8, 1969 France...............................6927464

[52] U.S. Cl......................................263/6 R, 263/28
[51] Int. Cl................................................F27b 9/14
[58] Field of Search................................263/6 R, 36

[56] References Cited

UNITED STATES PATENTS 3,431,346  3/1969  Westeren et al........................263/36

Primary Examiner—John J. Camby
Attorney—Cameron, Kerkam & Sutton

[57] ABSTRACT

A furnace for continuous sintering of pellets of ceramic nuclear-fuel material containing binder in a neutral or reducing atmosphere comprises a horizontal-axis tubular enclosure having heating means distributed along said enclosure and a support plate for the longitudinal displacement of pellet containers. A circulation system for maintaining a neutral or reducing atmosphere and for extracting the binder comprises inlets for injecting neutral or reducing gas at the two ends of the furnace and an outlet for withdrawing gas in an intermediate zone between the presintering and sintering zones. Means associated with a container-introduction lock-chamber placed at one end of the furnace and with an extraction lock-chamber for withdrawing containers at the other end of the furnace cause the containers to travel along the support plate from the introduction lock-chamber to the extraction lock-chamber.

7 Claims, 2 Drawing Figures 3,708,157

CONTINUOUS SINTERING FURNACE

This invention is concerned with a continuous furnace for sintering in a neutral or reducing atmosphere nuclear fuel pellets of ceramic material and particularly although not exclusively pellets of uranium oxide and/or of plutonium oxide.

The fabrication of nuclear fuel pellets entails the need for incorporation of organic binders during the shaping operation followed by removal and collection of these binders during a heat treatment or so-called preheating operation which precedes the sintering operation proper. By reason of the fact that the heat treatment operations must be carried out in a controlled atmosphere, it is necessary to take steps in order to ensure that the binders or evolved by-products of decomposition are in no way liable to diffuse into the sintering zone and exert an influence on this latter. Moreover, any operation involving processing of plutonium entails the need for leakproof equipment in order to guard against alpha contamination.

The invention is intended to provide a furnace for continuous sintering of pellets of ceramic nuclear-fuel material in a neutral or reducing atmosphere in order to meet practical requirements more effectively than furnaces of the prior art, especially insofar as the furnace according to the invention satisfies the requirements mentioned above. With this objective, the invention proposes a furnace comprising a horizontal-axis tubular enclosure equipped with heating means distributed along said enclosure and comprising: a support plate for the longitudinal displacement of pellet containers, a circulation system for maintaining a neutral or reducing atmosphere and for extracting binder comprising means for injecting neutral or reducing gas at the two ends of the furnace and means for suction of gas in an intermediate zone between the presintering and sintering zone and for producing condensation on the binder which is contained therein ; and means associated with a container-introduction lock-chamber placed at one end of the furnace and with an extraction lock-chamber for withdrawing containers at the other end of the furnace so as to cause said containers to travel along the support plate from the introduction lock-chamber to the extraction lock-chamber.

A clearer understanding of the invention will be obtained from the following description of a furnace constituting one embodiment which is given by way of example and not in any sense by way of limitation, reference being made to the accompanying drawings, wherein.

Figure 1:
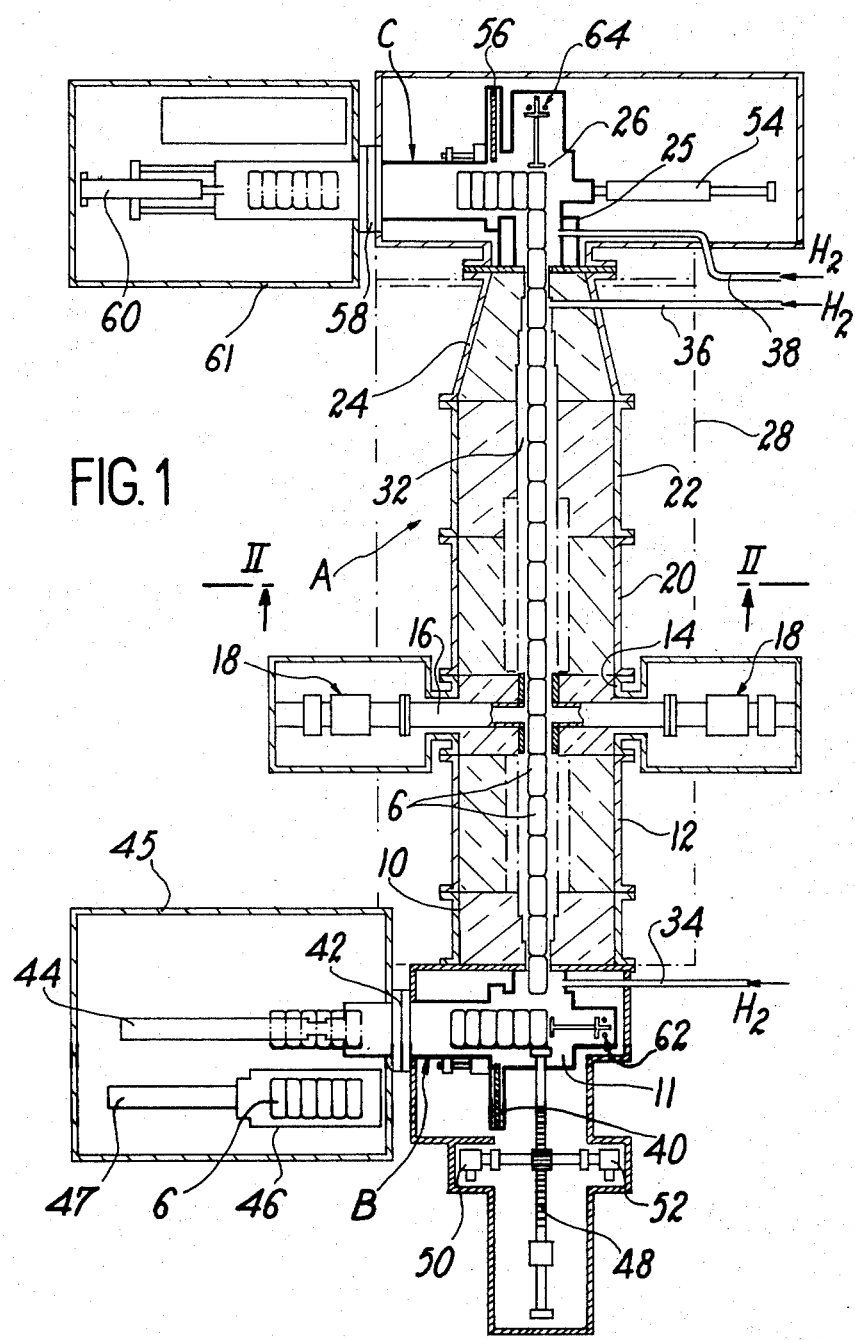
FIG. 1 is a part-sectional top view of the furnace.
Figure 2:
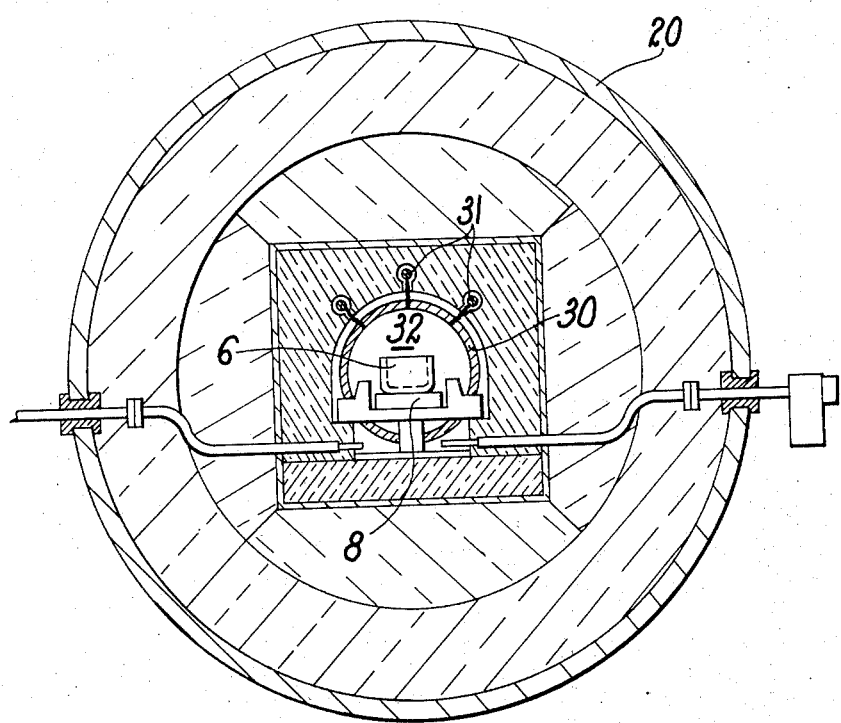
FIG. 2 is an enlarged sectional view taken along line II—II of FIG. 1.

The sintering furnace which is illustrated in FIGS. 1 and 2 can be considered as made up of a tubular enclosure which defines the furnace A proper, an introduction lock-chamber B which is placed at one end, an extraction lock-chamber C placed at the other end of the furnace and a mechanism for transferring containers loaded with pellets along the enclosure. The furnace A proper comprises in addition to the enclosure means for heating, for maintaining the controlled atmosphere and for suction and condensation of binding agents. The lock-chambers are in turn associated with a mechanism for introduction or discharge. These systems will now be described in turn.

The enclosure which defines the furnace proper is formed by juxtaposition of a series of blocks, each of which performs a given function. The containers 6 which are formed of molybdenum, for example, pass successively through said blocks on a longitudinal support plate 8 (as shown in FIG. 2).

There is first shown in the direction of transfer of the containers a short block 10 which is not fitted with heating elements and is intended to provide a transition from a relay chamber 11 into which the introduction lock-chamber B opens. There is then shown a preheating block 12 which is fitted with heating elements and intended to bring the pellets to a temperature of the order of 1,200°C. Said preheating block 12 is followed by a short block 14 and this latter is fitted with suction tubes 16 through which the binding agents and by-products of these latter are discharged. Said tubes open into condensers 18 in which the products to be retained are deposited. There are then shown two sintering blocks 20 and 22 which are fitted with heating elements and in which is maintained the maximum required temperature, namely 1,700°C, for example. Finally, the second sintering block 22 is connected to a conical block 24 which is extended by a pellet-cooling system (water jacket 25) and opens into a relay chamber 26.

Each block is delimited by an assembled casing of mild sheet steel. Said casing has a double wall and a space between the two walls constitutes a cooling water system, provision being made within said casing for an internal lining of refractory bricks. The successive blocks are detachably connected by means of flanged couplings fitted with bolts between the casings and leak-tightness is ensured by means of O-ring seals. The casings rest on a bed through which the fluid is admitted and discharged. In order to facilitate the removal of any one block, the casings can be fitted with rollers and thus permitted to carry out transverse displacements on the bed. Should it prove necessary, one section can be replaced without appreciable contamination of the workshop by means of a temporary servicing tent of plastic material which is placed temporarily in position and joined to the bed in leak-tight manner.

The heating means which are provided for the blocks 12, 20 and 22 are constituted by resistors 30 (as shown in FIG. 2) which are wound in the form of solenoids and attached to ceramic strips 31 by means of molybdenum fastening members which form in conjunction with the support plate a laboratory chamber 32. This chamber extends along the furnace and ensures good distribution of the thermal flux. The laboratory chamber 32 is provided in the intermediate block 14 with a connection to the condensers 18.

A suitable atmosphere is maintained within the furnace by means of a circulation system comprising injection pipes which are placed at both ends. There is shown in FIG. 1 a pipe 34 for injecting gas into the laboratory immediately upstream of the short block 10 and a pipe 36 for injecting the same gas which opens into the laboratory tube within the interior of the cooling block 24; another pipe 38 injects gas in order to balance the pressures slightly downstream of the block 24. The nature and flow rate of injected gas are such as to maintain the composition of the atmosphere within selected limits. The atmosphere can in particular be pure hydrogen, pure argon or preferably mixtures of argon and hydrogen, or helium and hydrogen.

The introduction lock-chamber B and extraction lock-chamber C as well as their ancillary mechanisms are connected to the relay chambers 11 and 26 of the furnace proper, with the result that the furnace as a whole has a U-shaped arrangement.

The introduction lock-chamber B is delimited by a housing formed of sheet steel which is assembled by welding. At the furnace end, said lock-chamber is provided with an isolating door 40 which can be secured in the closed position by means of a jack-operated locking mechanism (not shown in the drawings) and can be displaced transversely so as to provide a free passageway from the lock-chamber to the relay chamber 11.

The lock-chamber is also provided opposite to the isolating door 40 with an admission door 42 which is coupled with an introduction jack 44. This jack moves transversely within a glove box 45 at the same time as a loading tray 46 on which six containers 6 can be placed. When the assembly is displaced from the position of closure of the admission door (in which it is shown in FIG. 1) to the intended position of maximum opening, the loading tray will place the containers in the position shown in chain-dotted lines in FIG. 1 opposite to the lock-chamber. A jack 47 then serves to insert the containers of the tray 46 into the lock-chamber.

Once the containers 6 have been inserted into the relay chamber through the lock-chamber, said containers can be taken one by one and brought onto the support plate by means of a push-rod 48. Each time the push-rod 48 returns to the rear after having introduced a container, the jack 44 comes into operation and moves the remaining containers forward by one step. Said push-rod can be actuated either by a motor which produces forward displacement at low speed or by means of a motor which produces a movement of withdrawal at a higher speed than said forward displacement. Electromechanical clutch units serve to put either of the two motors 50 and 52 into operation. The connection between the driven member of each coupling unit and the push-rod 48 itself can be of the rack and pinion type.

The extraction lock-chamber C is similar in construction to the admission lock-chamber B. An expulsion jack 54 serves to thrust the containers out of the relay chamber 26 towards the interior of the lock-chamber C; this latter is delimited as in the case of the introduction lock-chamber by an isolating door 56 and a discharge door 58. By means of an extraction jack 60, an extraction tray carrying all the containers which are present within the lock-chamber can be withdrawn in a single operation when the lock-chamber is full. The containers are then withdrawn from the glove box 61.

The operation of the furnace will have become apparent from the foregoing description and will therefore be discussed only briefly. It will first be assumed that the furnace is in service, the admission and discharge doors 42 and 58 being closed in order to isolate the assembly which is constituted by the furnace A itself, the relay chambers 11 and 26 and the lock-chambers. The lock-chambers thus contain the same atmosphere as the furnace. A set of six containers 6 filled with pellets to be subjected to the sintering operation is placed on the loading tray 46.

When the last container is brought from the introduction lock-chamber in front of the push-rod by the introduction jack 44, this latter initiates by means of a limiting contact (not shown) a complete sequence of operations which, as will become apparent below, do not cause any interruption in the sintering of pellets which have already been introduced into the furnace A. This sequence begins with the supply of the jacks (not shown) which are intended to close the isolating door 40, then to apply said door against its seating. The introduction lock-chamber which is now hermetically sealed is subjected to a purge flow of nitrogen. Jacks (not shown in the drawings) unlock the mechanical system which retains the admission door 42 in a positive manner. The introduction jack 44 is moved back together with the door 42. The introduction jack 44 and the loading tray 46 are then displaced transversely until said tray comes into alignment with the admission door of the lock-chamber B. The loading jack 47 then comes into operation, inserts all the containers into the lock-chamber and then moves back. The jacks 44 and 47 are again displaced transversely and brought to their original positions, whereupon the introduction jack 44 and the door 42 are again advanced in order to apply this latter against its seating. The door 42 is then locked by mechanical means such as jack-operated toggle catches. A pump which is associated with the lock-chamber can be put into operation in order to evacuate this latter. The shielding gas is then introduced if necessary. Finally, the isolating door 40 is opened.

On completion of this sequence, the furnace is loaded, six containers being ready for introduction. It must be noted that, throughout the duration of these operations, there has been no interruption in the mechanical feed of containers 6 which have already been engaged under the action of the push-rod 48.

The push-rod 48 then takes the containers one by one and introduces them into the furnace A. When said push-rod which is driven by the forward-displacement motor 50 reaches the end of travel, it must come into position to take a fresh container. To this end, provision is made for a limiting contact which initiates the rearward withdrawal of said push-rod. The end of the movement of rearward withdrawal initiates the forward movement of the introduction jack 44 until the first container of the lock-chamber B depresses the contact 62. The jack 44 then stops and the container is in position. The push-rod resumes its travel under the action of the forward-displacement motor. It is apparent that the train of containers 6 which is thrust forward continuously stops only for a very short time (approximately 30 seconds to 1 minute) at the time of rearward withdrawal of the push-rod 48 and of forward motion of the jack 44. The containers thus pass through the short introduction block 10, the preheating block 12, the intermediate block 14, the heating blocks 20 and 22 and the cooling block 24. The containers are cold when they arrive opposite to the contact 64 which initiates the forward motion of the jack 54. Said jack places the container within the discharge lock-chamber C. When the sixth container has been introduced by the jack 54, the extraction cycle is started automatically. This cycle consists in:

rearward withdrawal of the jack 54,
closure of the isolating door 56,
purging of the lock-chamber C,
releasing of the discharge door 58,
withdrawal of the jack 60 accompanied by the door 58 and an unloading tray which is placed within the lock-chamber and on which the containers are located.

The containers are then withdrawn by hand and the operator carries out the manual re-starting of the automatic cycle which consists in :
forward motion of the jack 60 which again places the tray within the discharge lock-chamber C and applies the door 58 against its flange,
mechanical locking of the discharge door 58 by means of jack-operated toggle catches,
pumping of the lock-chamber C,
introduction of an atmosphere corresponding to that of the furnace,
opening of the isolating door 56.

The discharge lock-chamber is then ready to receive six fresh containers. It is apparent that, during the whole of this sequence, there has been no interruption of the mechanical feed.

The advantages of the furnace in accordance with the invention can clearly be visualized : the gas stream guarantees excellent sweeping of the parts in the direction of thrust in the presintering zone and in the opposite direction in the sintering zone. This arrangement is conducive to the discharge of binding agents and assists the thermal cycle. The gas velocities can be chosen so that, in the intermediate block, the gas which is loaded with binding agents cannot flow back to the sintering zone. The arrangement of the condenser is such that this latter can be made accessible within a glove box in order to permit withdrawal of the binding agents which have been collected. By virtue of its sectional construction, the furnace permits the possibility of rapid replacement of internal components in spite of contamination. Automatic operation can be developed to a very high degree. The solenoid structure of the heating elements ensures good thermal homogeneity throughout the transverse cross-section.

A furnace of the type described above has been constructed for the purpose of sintering pellets of mixed oxide $UO_2 - PuO_2$ in a reducing atmosphere. This furnace corresponds to a production of 1 metric ton of raw product per month, has an overall length of approximately 6.5 m and a power consumption of approximately 50 kW.

We claim:

1. A continuous sintering furnace for sintering pellets of ceramic nuclear fuel comprising a horizontal-axis tubular enclosure defining a tunnel having a presintering zone and a sintering zone; electrical heating means along said presintering zone; electrical heating means along said sintering zone to maintain said sintering zone at a temperature higher than that of said presintering zone; a longitudinal support plate in said enclosure; containers adapted to receive binder-containing pellets to be sintered and to move along said support plate; a gas circulation system for maintaining a neutral or reducing atmosphere in said enclosure and for extracting gaseous products from aid binder, said system including means for injecting neutral or chemically reducing gas at the two ends of the enclosure and means for drawing gas in an intermediate zone between presintering and sintering zones of said enclosure and for collecting the binder products which are contained therein; and means operatively associated with a container-inlet lock-chamber placed at one end of the furnace and with a container outlet lock-chamber at the other end of the furnace for moving said containers along the support plate from the inlet lock-chamber to the outlet lock-chamber.

2. A continuous sintering furnace comprising a horizontal axis tubular enclosure; heating means distributed along said enclosure; a longitudinal support plate in said enclosure; containers adapted to receive binder-containing pellets to be sintered and to move along said support plate; a gas circulation system for maintaining a neutral or reducing atmosphere in said enclosure and for extracting gaseous products from said binder, said system including means for injecting neutral or chemically reducing gas at the two ends of the enclosure and means for drawing gas in an intermediate zone between presintering and sintering zones of said enclosure; and means operatively associated with a container-inlet lock-chamber placed at one end of the furnace and with a container outlet lock-chamber at the other end of the furnace for moving said containers along the support plate from the inlet lock-chamber to the outlet lock-chamber, wherein said enclosure consists of separate tubular blocks joined together by demountable leak-tight connections, said presintering and sintering zones corresponding to different blocks.

3. A furnace according to claim 2, wherein the tubular blocks are provided with separate rollers adapted to run on a stationary bed transversally to the axis of the enclosure.

4. A furnace according to claim 2, wherein the gas suction means are connnected to condensers.

5. A furnace according to claim 1, wherein the inlet lock-chamber comprises an isolating door which can be displaced transversely to the direction of movement of the containers in order to provide a free passageway from the lock-chamber to a relay chamber located in front of the support plate and an admission door carrying an introduction jack associated with a loading tray adapted to receive a plurality of containers for transverse motion with said tray.

6. A furnace according to claim 5, wherein said means for moving the containers comprise a push-rod which is aligned with said longitudinal support plate and the relay chamber and motor means for said push-rod.

7. A furnace according to claim 6, wherein said motor means comprise a low-speed motor for forward motion and a high-speed motor for rearward withdrawal and said moving means additionally comprises electromechanical clutch units for coupling either of said motors to the push-rod.

* * * * *